(12) United States Patent
Oku et al.

(10) Patent No.: US 8,460,542 B2
(45) Date of Patent: Jun. 11, 2013

(54) SUCTION FILTER AND FUEL SUPPLY DEVICE

(75) Inventors: Toshihide Oku, Suzuka (JP); Tetsuya Hara, Nagoya (JP); Yoshinobu Kato, Ichinomiya (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 587 days.

(21) Appl. No.: 12/706,332

(22) Filed: Feb. 16, 2010

(65) Prior Publication Data

US 2010/0206793 A1    Aug. 19, 2010

(30) Foreign Application Priority Data

Feb. 16, 2009    (JP) .................. 2009-032848

(51) Int. Cl.
*C02F 1/00* (2006.01)
*B01D 37/00* (2006.01)

(52) U.S. Cl.
USPC ........ 210/172.4; 210/767; 210/806; 210/199; 210/321.87; 210/416.1; 210/457

(58) Field of Classification Search
USPC ................. 210/767, 650, 171, 172.4, 172.6, 210/416.4, 416.5
See application file for complete search history.

(56) References Cited

U.S. PATENT DOCUMENTS 4,304,664 A * 12/1981 McAlindon et al. ....... 210/172.3
5,584,988 A   12/1996 Hashimoto et al.
2004/0144705 A1  7/2004 Yamada et al.
2008/0169033 A1  7/2008 Tipton et al.
2011/0132825 A1  6/2011 Nishio

FOREIGN PATENT DOCUMENTS

| DE | 10 2010 053 387 | 6/2011 |
| JP | 62-16761 U | 1/1987 |
| JP | 63-87261 U | 6/1988 |
| JP | 2-171328 | 7/1990 |
| JP | 2001-82274 | 3/2001 |
| JP | 2007-224748 A | 9/2007 |

OTHER PUBLICATIONS

Examination Report dated May 8, 2012 from German Patent & Trademark Office for counterpart German patent application No. 10 2010 008 133.7 (with English translation thereof).

* cited by examiner

*Primary Examiner* — Krishnan S Menon
*Assistant Examiner* — Allison M Gionta
(74) *Attorney, Agent, or Firm* — J-Tek Law PLLC; Jeffrey D. Tekanic

(57) ABSTRACT

A suction filter may comprise a bag-shaped filter member and a passage member. The passage member is disposed in an internal space of the filter member. The passage member has a fuel passage and a plurality of openings, and guides fuel from the internal space to the outside of the internal space. The openings communicate the internal space of the filter member to the fuel passage. When the passage member is cut along a surface thereof perpendicular to a longitudinal direction of the passage member in each of the openings, a position on an outer circumferential surface of the passage member in the cut surface, in which the distance between the outer circumferential surface and the filter member is the smallest, is distant in a circumferential direction from a position on the outer circumferential surface where the opening is formed.

18 Claims, 10 Drawing Sheets

SUCTION FILTER AND FUEL SUPPLY DEVICE

CROSS-REFERENCE TO RELATED APPLICATION

This application claims priority to Japanese Patent Application No. 2009-32848 filed on Feb. 16, 2009, the contents of which are hereby incorporated by reference into the present application.

TECHNICAL FIELD

The present invention relates to a fuel supply device that supplies fuel within a fuel tank to the outside of the fuel tank, and relates particularly to a suction filter connected to a suction port of a fuel pump.

DESCRIPTION OF THE RELATED ART

A fuel tank installed in a vehicle has set up therein a fuel supply device for supplying fuel within a fuel tank to an internal combustion engine. This fuel supply device has a suction filter that is connected to a suction port of a fuel pump. The suction filter is a member for removing foreign matters contained in the fuel. The fuel pump suctions the fuel from which the foreign matters are eliminated by the suction filter, and then discharges the suctioned fuel. Japanese Patent Application Publication No. 2007-224748 discloses a conventional example of such a fuel supply device.

SUMMARY

In this fuel supply device, foreign matters adhere to the surface of the suction filter over time, and the filtration resistance gradually increases. This increase in the filtration resistance leads to a decline in fuel pump efficiency. In order to delay the increase in filtration resistance of the suction filter, it is desired to perform filtration using the entire filtering area of the suction filter so that the foreign matters adhere evenly to the entire filtering area. In the conventional suction filter, however, the foreign matters adhere easily in the vicinity of the suction port of the fuel pump due to its high suction pressure, but do not adhere easily in a place away from the suction port due to its low suction pressure. For this reason, the problem is that the pump efficiency of the fuel pump deteriorates in a short period of time because the entire filtering area is not used effectively.

In the suction filter according to the third embodiment of Japanese Patent Application Publication No. 2007-224748, a passage member is disposed in an internal space of the filter member. An opening that is communicated to the internal space of the filter member is formed at one end of the passage member, and a suction port of a fuel pump is connected to the other end of the filter member. The fuel suctioned into the suction filter flows from the opening on one end of the passage member into the passage member, and is then suctioned by the fuel pump through the passage member. Because the passage member is disposed within the filter member in this suction filter, adhesion of the foreign matters to the filter member in the vicinity of the suction port of the fuel pump is prevented. However, because the opening is formed only at a tip end of the passage member, the foreign matters adhere only to the filter member near the opening of the passage member, inhibiting the effective use of the entire filter member.

It is an object of the present teachings to provide a technology capable of preventing the uneven adhesion of foreign matters to a filter member of a suction filter.

In one aspect of the present teachings, a suction filter connected to a suction port of a fuel pump may comprise a bag-shaped filter member and a passage member. The passage member is disposed in an internal space of the filter member. The passage member has a fuel passage and at least one opening, and guides fuel from the internal space to the outside of the internal space. The opening communicates the internal space of the filter member to the fuel passage. When the passage member is cut along a surface thereof perpendicular to a longitudinal direction of the passage member in the opening, a position on an outer circumferential surface of the passage member in the cut surface, in which the distance between the outer circumferential surface and the filter member is the smallest, is distant in a circumferential direction from a position on the outer circumferential surface where the opening is formed.

With this suction filter, the passage member is disposed in the internal space of the filter member. The position where the opening is formed is distant from a position, on an outer circumferential surface of the passage member, which is closest to the filter member. For this reason, suction force is prevented from acting directly toward the filter member, and the uneven adhesion of the foreign matters to the filter member can be further prevented.

In another aspect of the present teachings, the passage member may have a plurality of openings, and the each of the plurality of openings may communicate the internal space of the filter member to the fuel passage. With this configuration, fuel that flows into the internal space through the filter member is suctioned from the plurality of openings to the fuel passage within the passage member. As a result, uneven adhesion of the foreign matters to the filter member can be prevented.

Further, in another aspect of the present teachings, one end of the passage member may be disposed in the internal space of the filter member; and the other end of the passage member may be connected to the suction port of the fuel pump. An opening area of each of the plurality of openings may decrease as moving toward the suction port of the fuel pump. With this configuration, the fuel does not flow easily into the fuel passage at the openings near the suction port of the fuel pump, but the fuel flows easily into the fuel passage at the openings distant from the suction port. Thus, the flow rate of the fuel flowing into each opening can be made uniform, and the uneven adhesion of the foreign maters to the filter member can be reduced.

Preferably, an upper end of the filter member is positioned higher than the suction port when the suction filter is connected to the suction port of the fuel pump. With this configuration, the filtering area of the filter member can be increased, and consequently deterioration of pump efficiency can be suppressed.

In another aspect of the present teachings, the filter member may be shaped so as to surround a circumference of the fuel pump when the suction filter is connected to the suction port of the fuel pump. With this configuration, the filtering area of the filter member can be increased.

In another aspect of the present teachings, when the suction filter is connected to the suction port of the fuel pump, (1) the filter member may be shaped into a tubular-shape extending in a longitudinal direction of the fuel pump and be shaped so as to surround the circumference of the fuel pump, (2) the passage member may extend in the longitudinal direction of the fuel pump through the internal space of the filter member, and (3) the openings may be opened in a circumferential direction of the fuel pump.

Here, the "tubular-shape" means not only a case where the bag-shaped filter member is curved or bent and shaped into a complete tube, but also a case where the filter member is curved or bent and shaped into a circular arc (i.e., the cross-sectional shape obtained by cutting the cross section perpendicular to an axis direction is shaped into a circular arc).

With this configuration, the area of the filter member can be increased, and the fuel can be suctioned by the entire filter member. Therefore, the filter member can be effectively prevented from being clogged, and deterioration of the pump efficiency can be suppressed over a long period of time.

Other objects, features and advantages of the present teachings will be readily understood after reading the following detailed description together with the accompanying drawings and claims. Of course, the additional features and aspects disclosed herein may be utilized singularly or, in combination with the above-described aspect and features.

DESCRIPTION OF THE PREFERRED EMBODIMENTS

Embodiment 1

Figure 1:
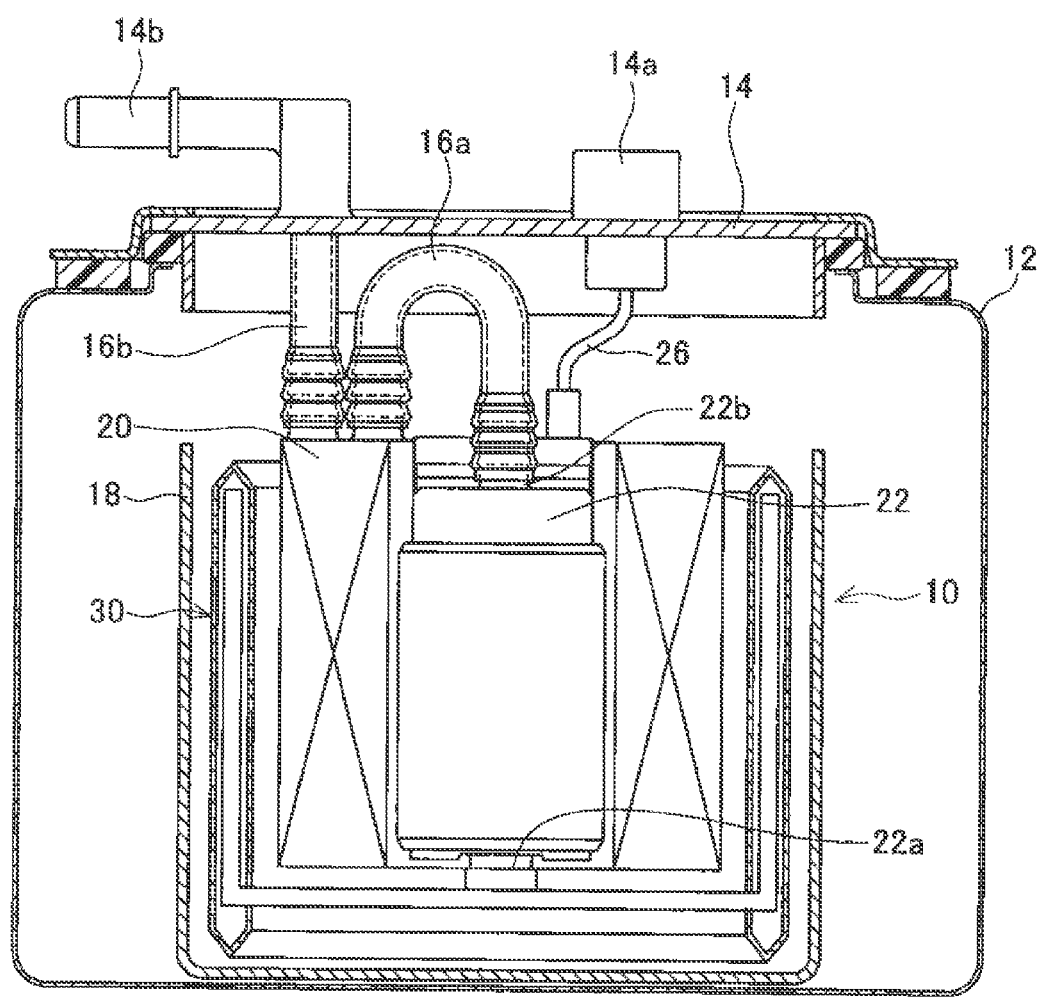
FIG. 1 is a vertical cross-sectional view of a fuel supply device according to a first embodiment of the present teachings.

A first embodiment of the present teachings will be described below with reference to the appended drawings. A fuel supply device of the present embodiment can be mounted to a fuel tank of an automobile and used for supplying fuel to an engine. As shown in FIG. 1, a lid 14 is attached to an opening of a ceiling part of a fuel tank 12 to close the opening. A fuel supply device 10 is inserted from the opening and disposed within the fuel tank 12.

A fuel discharge port 14b and connector 14a are formed on an upper surface of the lid 14. The fuel discharge port 14b is connected to one end of a fuel supply tube which is not shown. The other end of the fuel supply tube is connected to the engine. The connector 14a is connected to an external power source via a wiring which is not shown.

The fuel supply device 10 comprises a reservoir cup 18, a fuel pump 22, a fuel filter 20, and a suction filter 30. The reservoir cup 18 is in a substantially cylindrical shape and has an opening at its upper end, and further has a bottom part. The reservoir cup 18 houses the fuel pump 22, fuel filter 20 and suction filter 30 therein, and is installed in a bottom part of the fuel tank 12. A gap is formed between the suction filter 30 and the reservoir cup 18, and a space is formed also between the fuel filter 20 and the suction filter 30.

The fuel pump 22 has its axis placed perpendicular to the opening of the fuel tank 12, and is housed in the reservoir cup 18 such that a fuel discharge port 22b is placed on the upper side and a fuel suction port 22a on the lower side. The fuel discharge port 22b is connected to the fuel filter 20 via a connecting tube 16a. The fuel filter 20 is in a substantially cylindrical shape and is set up around the fuel pump 22. The fuel filter 20 is connected to the fuel discharge port 14b via a connecting tube 16b. Furthermore, the fuel pump 22 is connected to the connector 14a via a wiring 26.

Figure 2:
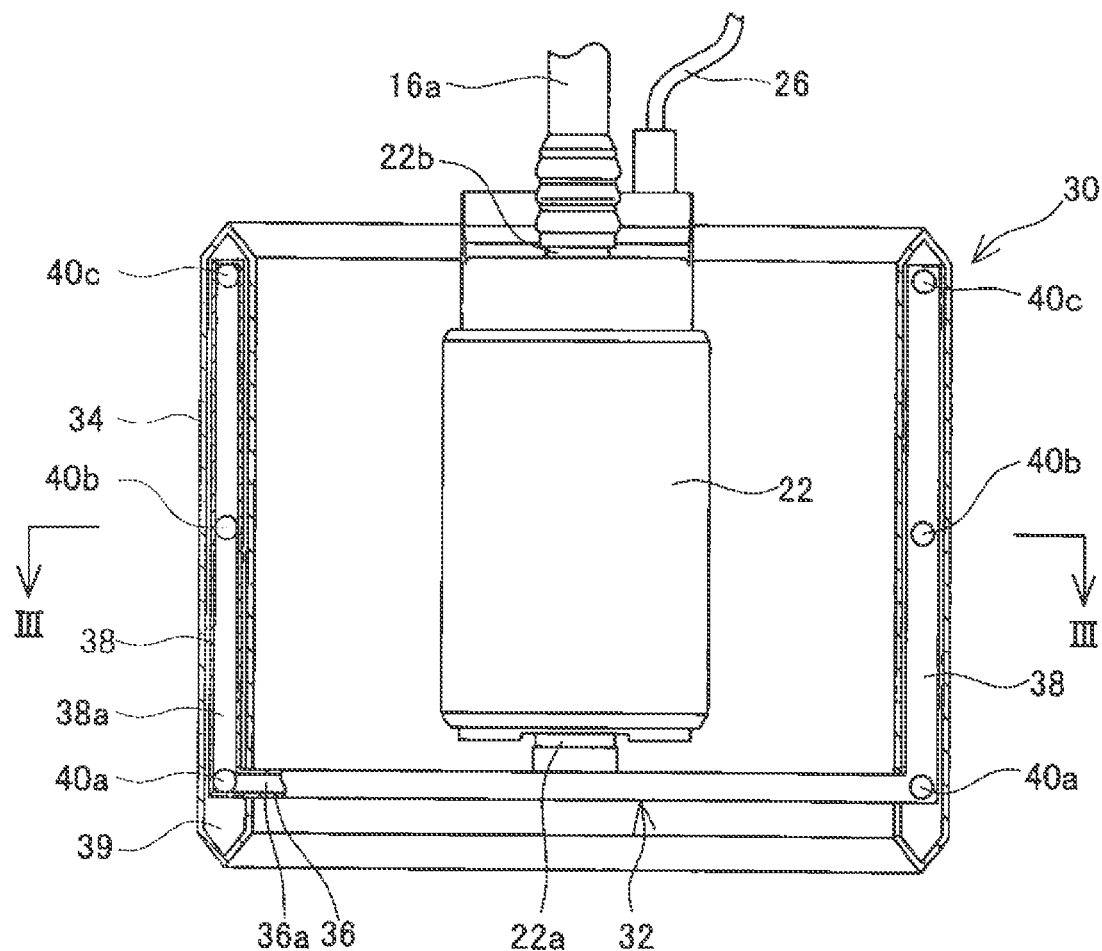
FIG. 2 is an enlarged view of a substantial part shown in FIG. 1.
Figure 3:
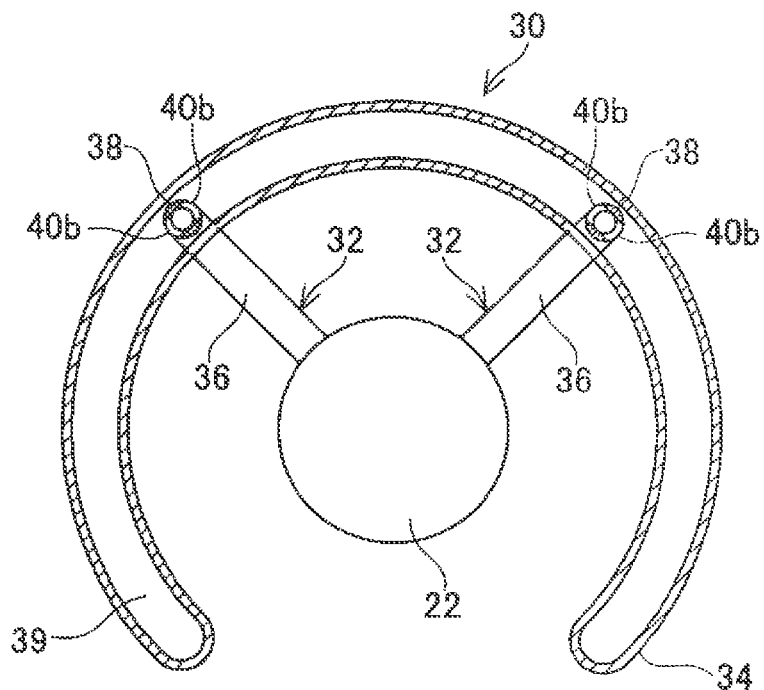
FIG. 3 is a cross-sectional view taken along the line III-III shown in FIG. 2.
Figure 4:
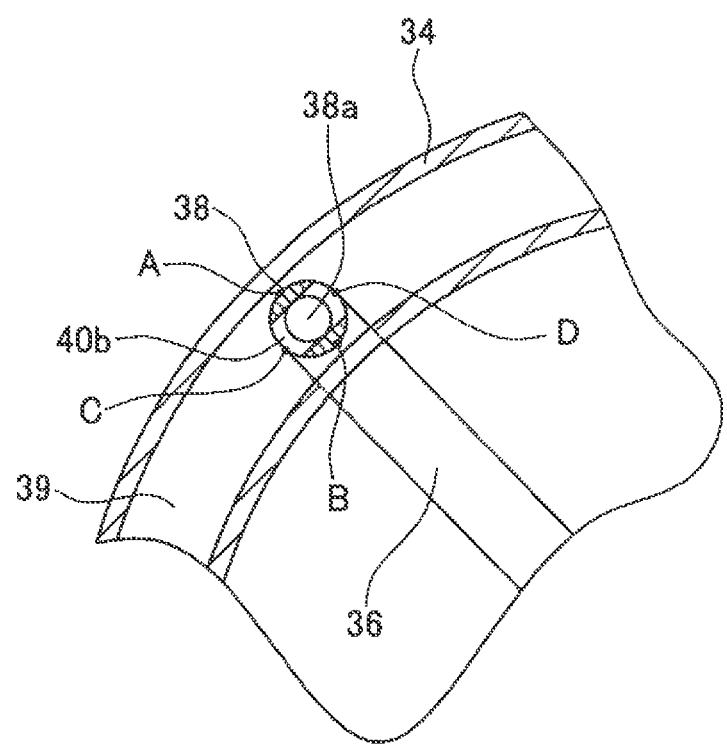
FIG. 4 is an enlarged view of a substantial part shown in FIG. 3.

As shown clearly in FIGS. 2 to 4, the suction filter 30 comprises a bag-shaped mesh 34 and two passage members 32. The mesh 34 is held by an unshown resin frame so that the front side and the back side of the mesh 34 do not stick to each other, and an internal space 39 is formed inside the mesh 34. The mesh 34 is also held in a curved manner by the frame, and shaped into a substantially cylinder that has a cutout (slit) in a part of the circumferential direction thereof (see FIG. 3). An upper end of the substantially cylindrical mesh 34 is substantially the same height as an upper end of the fuel pump 22 (i.e., the fuel discharge port 22b). A lower end of the mesh 34, on the other hand, is positioned below a lower end of the fuel pump 22 (i.e., the fuel suction port 22a).

Each of the passage member 32 includes a connection passage part 36 extending in a direction perpendicular to the axis of the fuel pump 22, and a suction part 38 extending parallel to the axis of the fuel pump 22. One end of the connection passage part 36 is connected to the fuel suction port 22a of the fuel pump 22. The connection passage part 36 extends radially from the fuel suction port 22a and penetrates near the lower end of the mesh 34, to have a tip end of the connection passage part 36 positioned in the internal space 39 of the mesh 34. A fuel flow path 36a is formed within the connection passage part 36. The fuel flow path 36a is communicated to the fuel suction port 22a of the fuel pump 22. As shown in FIG. 3, the angle formed by the two passage members 32 is approximately 90°, and the connection passage parts 36 penetrate the mesh 34 at different positions in the circumferential direction of the fuel pump 22.

One end of the respective suction part 38 is connected to the tip end of the corresponding connection passage part 36. The suction parts 38 are disposed within the internal space 39 of the mesh 34. The suction parts 38 extend upward from the tip ends of the connection passage parts 36 (i.e., the suction parts 38 extend in a direction parallel to the axial direction of the fuel pump 22), and have their respective tip end positioned in the vicinity of the upper end of the mesh 34. A fuel flow path 38a is formed within each of the suction parts 38. A plurality of openings 40a, 40b, 40c are formed in each of the suction parts 38. The openings 40a, 40b, 40c allow the internal space 39 of the mesh 34 and the fuel flow paths 38a of the suction parts 38 to be communicated to each other. The openings 40a are positioned in the vicinity of the lower end of the mesh 34 (i.e., a coupling part between the mesh 34 and the respective connection passage part 36), the openings 40c in the vicinity of the upper end of the mesh 34, and the openings 40b in substantially the middle between the openings 40a and the openings 40c.

The relationship Sc>Sb>Sa is established among the opening area Sa of the opening 40a, the opening area Sb of the opening 40b, and the opening area Sc of the opening 40c. Therefore, the opening 40c has the smallest flow path resistance, while the opening 40a has the largest flow path resistance, and the opening 40b has the flow path resistance intermediate therebetween.

In addition, as shown in FIGS. 3 and 4, the direction in which the openings 40a, 40b, 40c are opened is the circumferential direction of the fuel pump 22. Specifically, the openings 40a, 40b, 40c are formed in positions C, D distant from a point A that is closest to the outer surface of the mesh 34 (see FIG. 4) and a point B that is closest to the inner surface of the mesh 34 on an outer circumferential surface of the suction part 38. It may also be said that the openings 40a, 40b, 40c are formed offset from the points A and B, so as not to coincide therewith (Although FIG. 4 shows the opening 40b only, the openings 40a and 40c have the same structure). As is clear from FIGS. 3 and 4, the openings 40a, 40b, 40c are respectively formed in two sections on the outer circumferential surface of the suction part 38, and the pair of each of the openings 40a, 40b, 40c face each other.

The operation of the fuel supply device will be explained below. The fuel pump 22 is driven by a supply of electric power from the external power source. When the fuel pump 22 is driven, the fuel within the reservoir cup 18 is suctioned from the outside of the mesh 34 of the suction filter 30 to the inside. At this moment, the fuel is filtered by the mesh 34, and foreign matters contained in the fuel adhere to the outer surface of the mesh 34. The fuel obtained after removing the foreign matters therefrom is suctioned from the openings 40a, 40b, 40c of each passage member 32 into the fuel flow path 38a thereof. The fuel suctioned into the fuel flow path 38a is then suctioned from the fuel suction port 22a into the fuel pump 22 through the fuel flow path 36a. The fuel suctioned into the fuel pump 22 is pressurized and discharged from the fuel discharge port 22b. The fuel discharged from the fuel pump 22 is fed to the fuel filter 20 and filtered again. The pressure of the fuel filtered by the fuel filter 20 is adjusted to the pressure by an unshown pressure regulator, on the basis of the operating state of the engine. The pressure-adjusted fuel is fed from the fuel discharge port 14b to the engine. On the other hand, the fuel that is returned from the pressure regulator is fed to an unshown jet pump. The jet pump suctions the fuel of the fuel tank 12 into the reservoir cup 18 by injecting the fuel fed from the pressure regulator. As a result, the fuel within the fuel tank 12 is moved into the reservoir cup 18.

In the fuel supply device of the present embodiment, the plurality of passage members 32 are disposed in the internal space of the mesh 34, and the plurality of openings 40a, 40b, 40c are formed in each passage member 32. Moreover, the openings 40a, 40b, 40c are disposed at intervals in the axial direction of the fuel pump 22. Thus, the fuel within the internal space 39 of the mesh 34 is dispersed from these openings 40a, 40b, 40c and suctioned into the passage members 32. Consequently, the fuel within the reservoir cup 18 is suctioned from the wide area of the mesh 34 into the internal space 39 of the mesh 34. As a result, the foreign matters are prevented from adhering unevenly to the surface of the mesh 34.

Moreover, the opening areas Sa, Sb, Sc of the openings 40a, 40b, 40c increase as moving away from the fuel suction port 22a (i.e., Sa<Sb<Sc). Thus, the flow rate of the fuel flowing from each of the openings 40a, 40b, 40c into the passage members 32 becomes uniform. That is, fuel suction force of the openings 40a, 40b, 40c becomes uniform. As a result, the uneven adhesion of the foreign matters to the mesh 34 can be prevented.

Furthermore, the opening direction of the openings 40a, 40b, 40c is the circumferential direction of the fuel pump 22 (i.e., the direction parallel to the outer or inner surface of the mesh 34). For this reason, the direction in which the fuel suction force of each of the openings 40a, 40b, 40c acts coincides with the direction toward the internal space 39 of the mesh 34. Thus, the foreign matters are prevented from adhering unevenly to the surface of the mesh 34 in the vicinity of the openings 40a, 40b, 40c.

In the fuel supply device of the present embodiment, the fuel can be suctioned using the entire mesh 34, by disposing the passage members 32 within the internal space 39 of the mesh 34. Therefore, the foreign matters can be prevented from adhering unevenly to the surface of the mesh 34. Moreover, the mesh 34 is shaped into a cylinder that extends vertically along the circumferential surface of the fuel pump 22, and a large filtering area is formed. Due to these configurations, the mesh 34 can be prevented from being clogged, and the pump efficiency of the fuel pump can be maintained over a long period of time.

Embodiment 2

Figure 5:
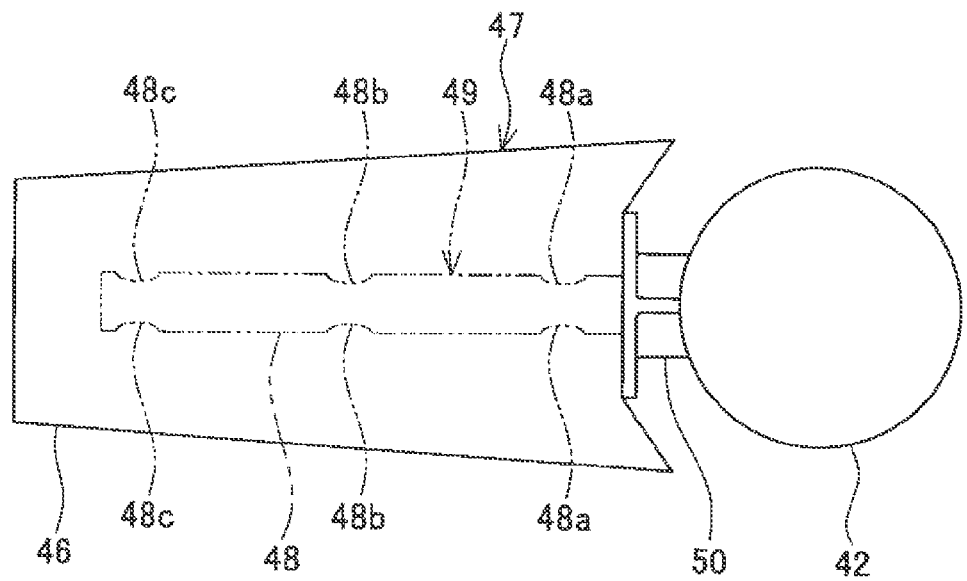
FIG. 5 is a plan view of a fuel supply device according to a second embodiment of the present teachings.
Figure 6:
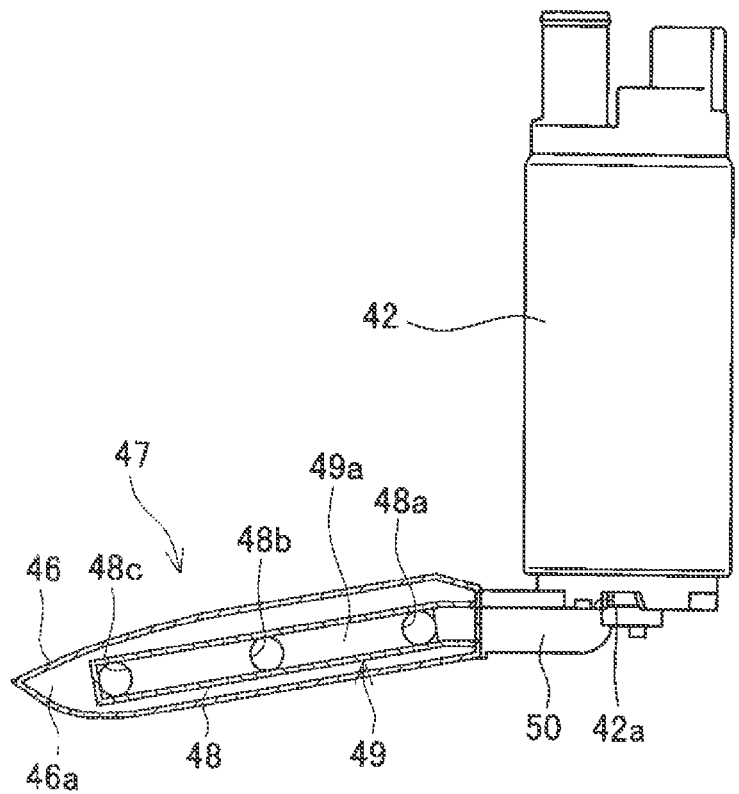
FIG. 6 is a side view of the fuel supply device shown in FIG. 5.

A fuel supply device according to a second embodiment of the present teachings will be described below with reference to FIGS. 5 and 6. As shown in FIGS. 5 and 6, a suction filter 47 of the second embodiment comprises a bag-shaped mesh 46 and a passage member 49. The mesh 46 is held by an unshown resin frame so that the front side and the back side of the mesh 46 do not stick to each other, and an internal space 46a is formed inside the mesh 46. Unlike the first embodiment, the mesh 46 is shaped so as to extend obliquely downward in a linear manner from a fuel suction port 42a of a fuel pump 42.

The passage member 49 comprises a base end part 50 and a suction part 48. The base end part 50 is connected to the fuel suction port 42a of the fuel pump 42. The suction part 48 extends in the internal space 46a of the mesh 46 toward a tip end of the mesh 46. A plurality of openings 48a, 48b, 48c are formed in the suction part 48. The openings 48c are disposed in the vicinity of a tip end part of the mesh 46, the openings 48a in the vicinity of a base end part of the mesh 46, and the openings 48b in substantially the middle between the openings 48a and the openings 48c.

As shown in FIG. 5, the direction in which the openings 48a, 48b, 48c are opened is a direction perpendicular to a longitudinal direction of the mesh 46 (i.e., the vertical direction in FIG. 5). Therefore, the sufficient internal space 46a is formed in the opening direction of the openings 48a, 48b, 48c. (In other words, although the sufficient internal space 46a is formed between the passage member 49 and the mesh 46 in the vertical direction of FIG. 5, such sufficient internal space 46a is not formed between the passage member 49 and the mesh 46 in the vertical direction of FIG. 6.)

In addition, as with the first embodiment, the relationship Sc>Sb>Sa is established among the opening area Sa of the opening 48a, the opening area Sb of the opening 48b, and the opening area Sc of the opening 48c.

In the fuel supply device of the second embodiment as well, the passage member 49 is disposed in the mesh 46 of the suction filter 47, and the plurality of openings 48a, 48b, 48c are formed in this passage member 49. Moreover, the opening areas Sa, Sb, Sc of the openings 48a, 48b, 48c increase as moving away from the fuel suction port 42a of the fuel pump 42 (Sa<Sb<Sc). In addition, the sufficient internal space 46a is ensured in the direction in which the openings 48a, 48b, 48c are opened. Therefore, the fuel within the fuel tank is suctioned from the wide area of the mesh 46 to the internal space 46a of the mesh 46. In this manner, the foreign matters are prevented from adhering unevenly to the surface of the mesh 46, and the pump efficiency of the fuel pump can be maintained over a long period of time.

Embodiment 3

A third embodiment according to a third embodiment of the present teachings will be described below with reference to FIGS. 7-9. The configuration of a suction filter of the present embodiment is different from that of the first embodiment. Thus, the differences with the first embodiment are mainly described hereinbelow, and the overlapping description is omitted.

Figure 7:
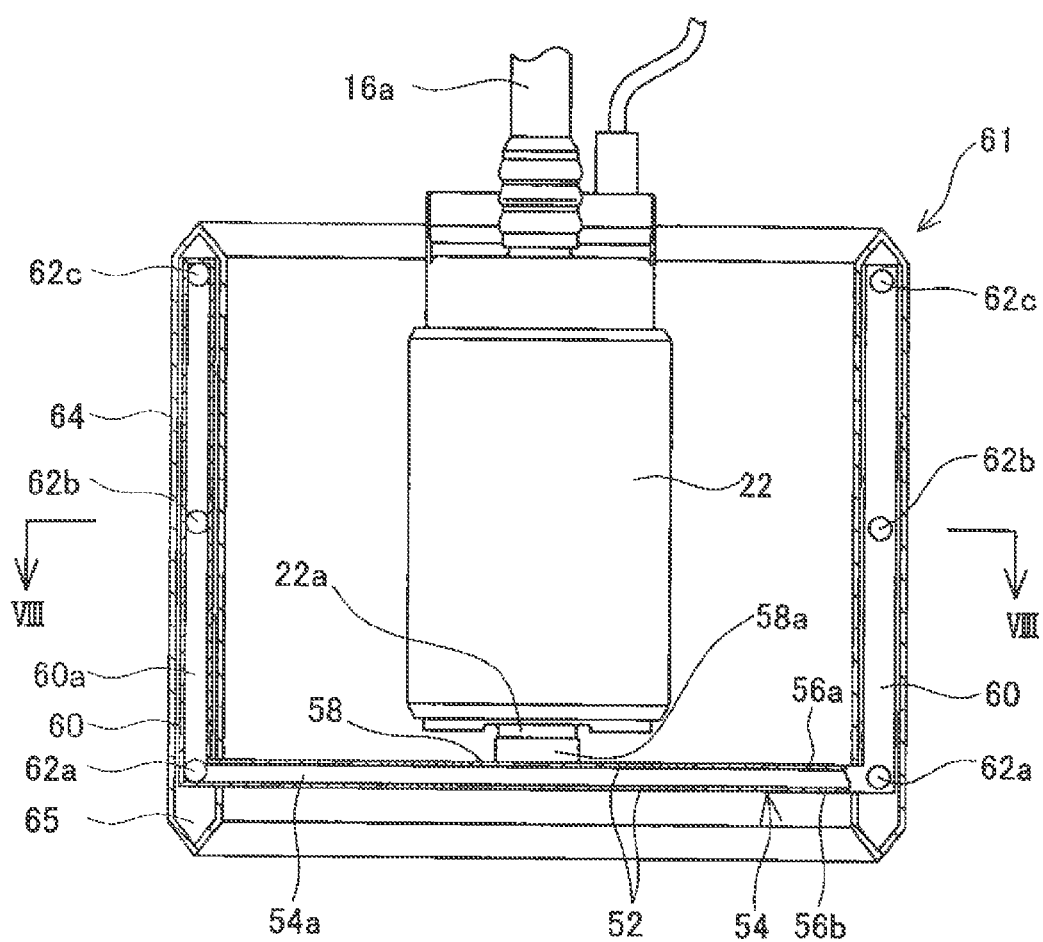
FIG. 7 is a vertical cross-sectional view of a fuel supply device according to a third embodiment of the present teachings.
Figure 8:
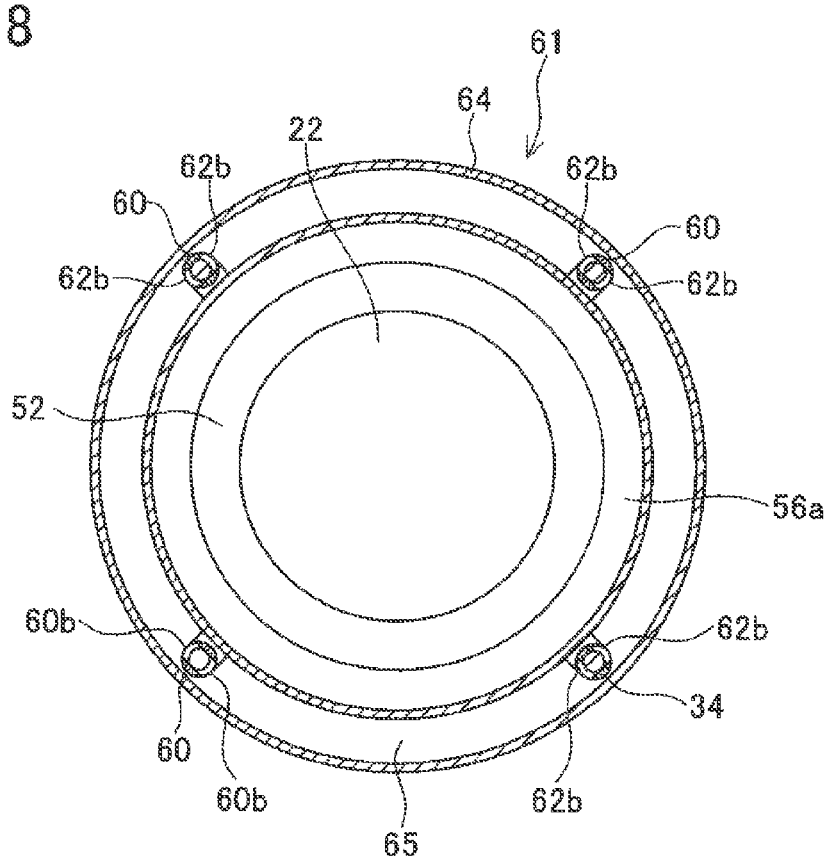
FIG. 8 is a cross-sectional view taken along the line VIII-VIII shown in FIG. 7.
Figure 9:
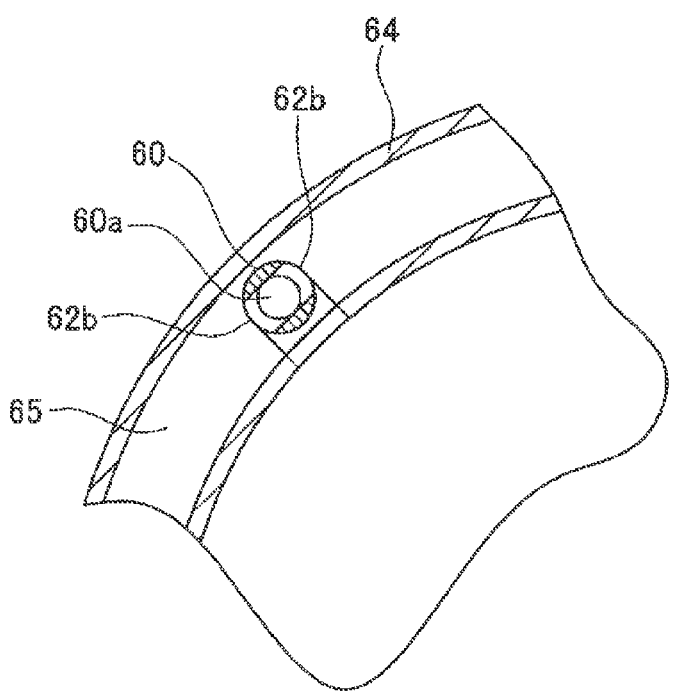
FIG. 9 is an enlarged view of a substantial part shown in FIG. 8.

As shown in FIGS. 7 to 9, a suction filter 61 comprises a bag-shaped mesh 64, a first passage member 54, and four second passage members 60. The bag-shaped mesh 64 is held in the shape of a substantially cylinder by an unshown resin frame, has an internal space 65 formed therein, and surrounds the entire circumference of the fuel pump 22. That is, the mesh 64 of the present embodiment is shaped into a complete cylindrical shape without any cutout in a part of its circumferential direction (see FIG. 8).

As shown in FIGS. 7 and 8, the first passage member 54 has two disc-shaped plates 56a, 56b. A fuel flow path 54a is formed between the two plates 56a, 56b. A connecting part 58a connected to the fuel pump 22 is formed in the plate 56a on the fuel pump 22 side. The connecting part 58a is connected to the fuel suction port 22a of the fuel pump 22. A mesh part 52 is formed in each of the plates 56a, 56b. The fuel within the fuel tank can flow into the fuel flow path 54a through the mesh parts 52. An outer circumferential end of each of the plates 56a, 56b is closed and coupled to the vicinity of a lower end part of the mesh 64.

The second passage members 60 are disposed circumferentially at equal intervals at an outer circumferential end of the first passage member 54. The second passage members 60 are disposed in the internal space 65 of the mesh 64 and extend upward through the internal space 65. A base end of each of the second passage members 60 is connected to the first passage member 54, and a tip end of the same is positioned in the vicinity of an upper end of the mesh 64. A fuel flow path 60a is formed inside each of the second passage members 60. The fuel flow paths 60a are communicated to the fuel flow path 54a of the first passage member 54.

A plurality of openings 62a, 62b, 62c are formed in each of the second passage members 60. The openings 62a are formed in the vicinity of a lower end of the mesh 64, the openings 62c in the vicinity of the upper end of the mesh 64, and the openings 62b in substantially the middle between the openings 62a and the openings 62c. The openings 62a, 62b, 62c allow the internal space 65 of the mesh 64 and the fuel flow path 60a to be communicated to each other.

Moreover, as shown in FIGS. 8 and 9, and as with the first embodiment, each of the openings 62a, 62b, 62c is opened in the circumferential direction of the fuel pump 22, and formed in two sections on the outer circumferential surfaces of the second passage members 60 such that the pair of each of the openings 62a, 62b, 62c face each other. Furthermore, as with the first embodiment, the relationship Sc>Sb>Sa is established among the opening area Sa of the opening 62a, the opening area Sb of the opening 62b, and the opening area Sc of the opening 62c.

In this fuel supply device, when the fuel pump 22 is activated, the fuel within the fuel tank is suctioned from the outside of the mesh 64 to the inside thereof. That is, the fuel flows to the fuel flow path 60a of each second passage member 60 via the openings 62a, 62b, 62c. The fuel flowing into the fuel flow paths 60a is suctioned by the fuel pump 22 via the fuel flow path 54a of the first passage member 54. Further, the fuel within the fuel tank flows into the fuel flow path 54a of the first passage member 54 via the mesh part 52 of the first passage member 54, and is suctioned by the fuel pump 22.

In the fuel supply device of the present embodiment, the four second passage members 60 are disposed circumferentially at equal intervals in the mesh 64 of the suction filter 61, and the plurality of openings 62a, 62b, 62c are formed in each of these second passage members 60. In addition, the opening areas Sa, Sb, Sc of the openings 62a, 62b, 62c increase as moving away from the fuel suction port 22a of the fuel pump 22 (i.e., Sa<Sb<Sc), and the direction in which the openings 62a, 62b, 62c are opened is the circumferential direction of the fuel pump 22. Due to these configurations, the fuel is suctioned from the wide area of the mesh 64 to the internal space 65 of the mesh 64. As a result, the foreign matters are prevented from adhering unevenly to the surface of the mesh 64.

Also, in the fuel supply device of the present embodiment, the mesh part 52 is formed in the first passage member 54, and therefore the fuel can be suctioned from the mesh part 52. Therefore, the filtering area of the suction filter 61 further increases, and consequently the pump efficiency of the fuel pump can be maintained well over a long period of time.

In the fuel supply device of the present embodiment, first, a large amount of fuel is suctioned from the mesh part 52 of the first passage member 54, and consequently a large amount of foreign matters adhere to the mesh part 52, thereby clogging the mesh part 52. Thereafter, a large amount of fuel is suctioned from the mesh 64. Thereafter, because the fuel is suctioned from the entire mesh 64 by the second passage members 60, the foreign matters are prevented from adhering unevenly to the mesh 64. As a result, the pump efficiency of the fuel pump can be maintained well over a long period of time.

Embodiment 4

A fourth embodiment of the present teachings will be described below with reference to FIGS. 10-12. The configuration of a suction filter of the present embodiment is different from those of the first and third embodiments. Thus, the differences with the first and third embodiments are mainly described here, and the overlapping description is omitted.

Figure 10:
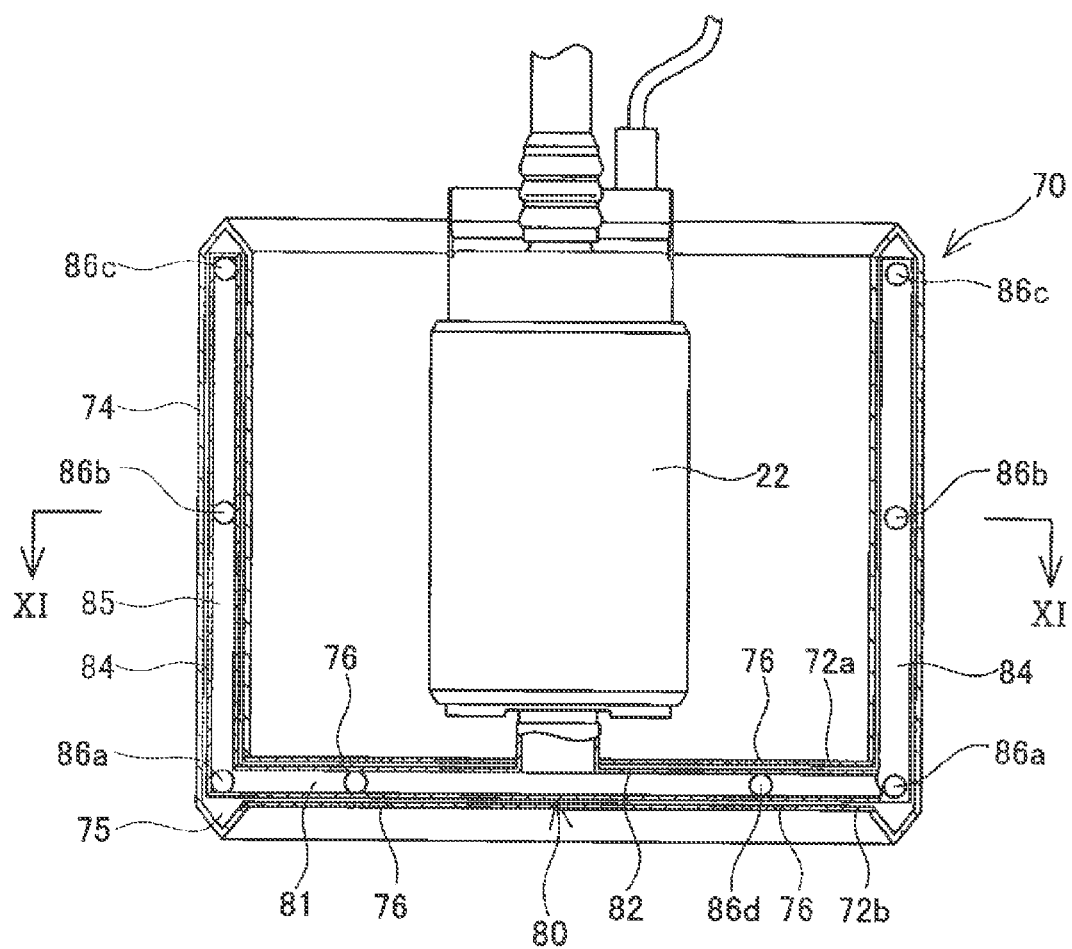
FIG. 10 is a vertical cross-sectional view of a fuel supply device according to a fourth embodiment of the present teachings.
Figure 11:
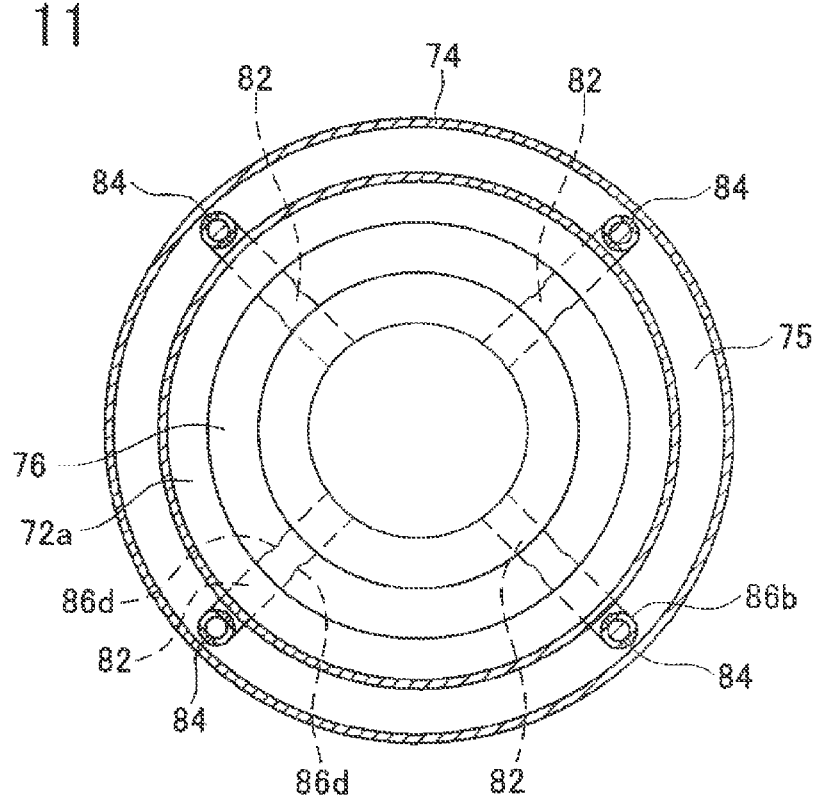
FIG. 11 is a cross-sectional view taken along the line XI-XI shown in FIG. 10.
Figure 12:
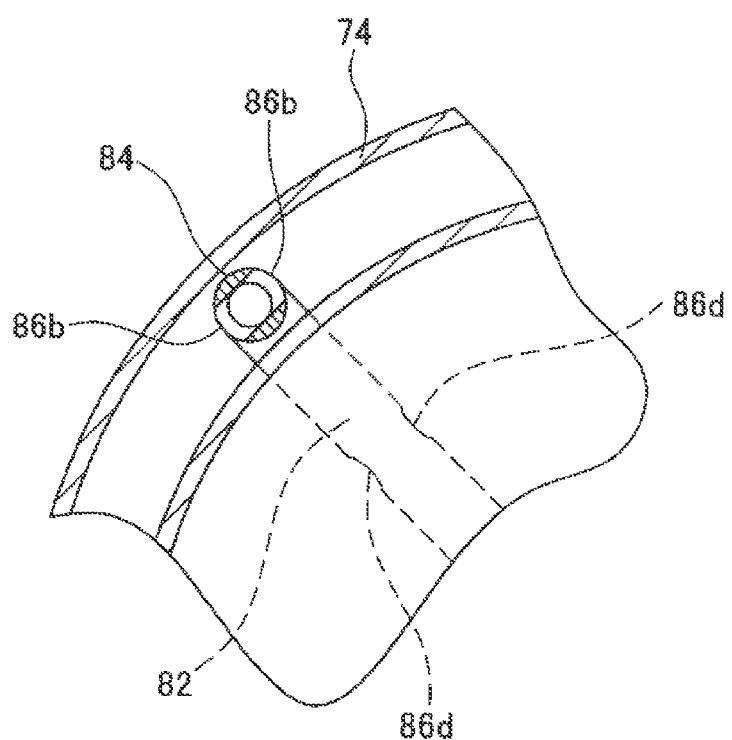
FIG. 12 is an enlarged view of a substantial part shown in FIG. 11.

As shown in FIGS. 10 to 12, a suction filter 70 has a bag-shaped mesh 74, two plates 72a, 72b, and four passage members 80. As with the third embodiment, the bag-shaped mesh 74 is held in the shape of a substantially cylinder by an unshown resin frame, has an internal space 75 formed therein, and surrounds the entire circumference of the fuel pump 22.

As shown clearly in FIGS. 10 and 11, the plates 72a, 72b are in a substantially disc shape. Outer circumferential edges of the plates 72a, 72b are opened and communicated to the vicinity of the lower end of the mesh 74. An internal space is formed between the plates 72a, 72b and coupled to the internal space 75 of the mesh 74. A mesh part 76 is formed on each of the plates 72a, 72b. Therefore, the fuel within the fuel tank can flow into the internal space between the plates 72a, 72b through the mesh parts 76.

As with the first embodiment, each of the passage members 80 comprises a connection passage part 82 extending in a direction perpendicular to the axis of the fuel pump 22, and a suction part 84 extending parallel to the axis of the fuel pump 22. The connection passage parts 82 are disposed in the internal space between the plates 72a, 72b. Base ends of the connection passage parts 82 are connected to the fuel suction port of the fuel pump 22. The connection passage parts 82 extend radially through the internal space between the plates 72a, 72b, and have their respective tip end positioned in the internal space 75 of the mesh 74. A fuel flow path 81 is formed within each connection passage part 82. The fuel flow paths 81 are communicated to the fuel suction port of the fuel pump 22. Openings 86d are formed in each connection passage part 82. The openings 86d are disposed in a position corresponding to the mesh part 76 of each of the plates 72a, 72b. The direction in which the openings 86d are opened is the direction parallel to the plates 72a, 72b (i.e., the direction parallel to the mesh part 76). Further, the openings 86d are each formed in two respective sections on an outer circumferential surface of the connection passage part 82 so as to face each other (see FIG. 11). Note that the angle formed by the adjacent passage members 80 is approximately 90°, and that the passage members 80 are disposed circumferentially at equal intervals, as shown in FIG. 11.

A tip end of each connection passage part 82 is connected to one end of the corresponding suction part 84. The suction parts 84 are disposed within the internal space 75 of the mesh 74. The suction parts 84 extend in the axial direction of the fuel pump 22, and have their respective tip end positioned in the vicinity of an upper end of the mesh 74. A fuel flow path 85 is formed within each suction part 84. A plurality of openings 86a, 86b, 86c are formed in each suction part 84. The openings 86a, 86b, 86c allow the internal space 75 of the mesh 74 and the fuel flow paths 85 to be communicated to each other. Furthermore, as shown in FIGS. 10 and 11, and as with the first embodiment, each of the openings 86a, 86b, 86c is opened in the circumferential direction of the fuel pump 22, and each pair of the openings 86a, 86b, 86c are formed in two sections on the outer circumferential surface of the suction part 84, and face each other. Note that the relationship Sc>Sb>Sa>Sd is established among the opening area Sa of the opening 86a, the opening area Sb of the opening 86b, the opening area Sc of the opening 86c, and the opening area Sd of the opening 86d.

In this fuel supply device, when the fuel pump 22 is activated, the fuel within the fuel tank is suctioned from the outside of the mesh 74 to the inside thereof, and is further suctioned from the mesh part 76 to the internal space between the plates 72a, 72b. The suctioned fuel flows into the fuel flow paths 81, 85 within each passage member 80 via the openings 86a, 86b, 86c, 86d, and is then suctioned by the fuel pump 22 via the fuel flow paths 81, 85.

In this fuel supply device of the present embodiment as well, the four passage members 80 are disposed in the internal space between the plates 72a, 72b of the suction filter 70 and the internal space 75 of the mesh 74, and the plurality of openings 86a, 86b, 86c, 86d are formed in each of these passage members 82. The opening areas Sa, Sb, Sc, Sd of the openings 86a, 86b, 86c, 86d increase as moving away from the fuel suction port of the fuel pump 22 (Sd<Sa<Sb<Sc), and the direction in which the openings 86a, 86b, 86c, 86d are opened is the direction in which the mesh 74 extends. Due to these configurations, the fuel is suctioned from the mesh part 76 and the entire mesh 74. As a result, the foreign matters are prevented from adhering unevenly to the surfaces of the mesh part 76 and the mesh 74, and the pump efficiency of the fuel pump can be maintained well over a long period of time.

Note that the shapes of the filter members are not limited to the shapes described in the above embodiments and can be designed arbitrarily. The number of passage members and the positions for disposing these passage members can be determined appropriately according to the shape of the filter members. In addition, the number of openings formed in each passage member, the shape of the openings, and the opening areas can also be determined appropriately according to the shape of the filter members.

Figure 13:
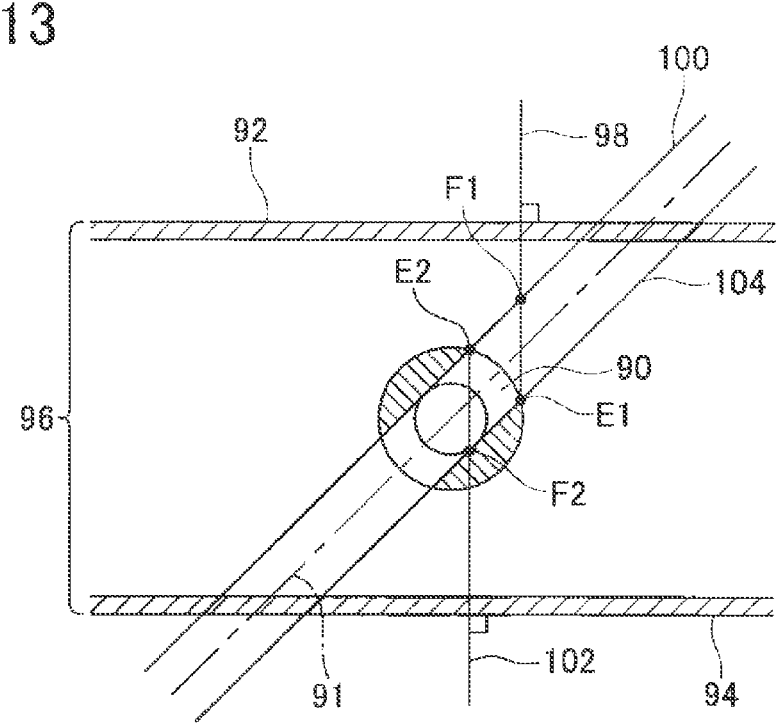
FIG. 13 explains one example of the opening direction of each of the plurality of openings.
Figure 14:
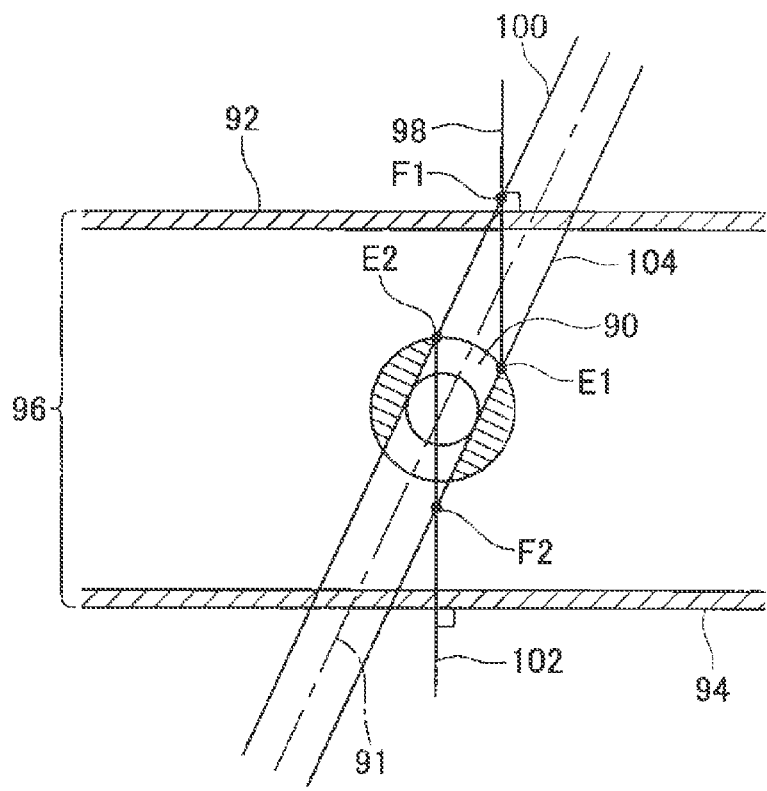
FIG. 14 explains another example of the opening direction of each of the plurality of openings.

Further, the opening direction of each of the plurality of openings is not limited to the direction parallel to the filtration surface. As shown in FIG. 13, the opening direction 91 of the opening 90 may be determined such that (1) a first intersection point F1 of a first line 100 and a second line 98 is positioned within the inner space 96 provided between a first filtration surface 92 and a second filtration surface 94, and (2) a second intersection point F2 of a third line 104 and a forth line 102 is positioned within the inner space 96. In FIG. 13, the first line 100 extends from a first filtration surface side edge E2 of the opening 90 in the opening direction. The second line 98 extends from a second filtration surface side edge E1 of the opening 90 in a direction perpendicular to the first filtration surface 92. The third line 104 extends from the second filtration surface side edge E1 of the opening 90 in the opening direction. The forth line 102 extends from the first filtration surface side edge E2 of the opening 90 in a direction perpendicular to the second filtration surface 94. On the other hand, as shown in FIG. 14, if the intersection point F1 or F2 is positioned outside of the inner space 96, suction force acts more directly to the filtration surface 92. Therefore, by determining the opening direction such that the first intersection point F1 and second intersection point F2 are positioned within the inner space 96, suction force can be prevented from acting directly toward the filtration surface 92. Furthermore, some of the plurality of openings may be determined such that the first intersection point F1 and second intersection point F2 are positioned within the inner space 96, and the rest of the plurality of openings may be perpendicular to the first filtration surface 92 or second filtration surface 94.

Figure 15:
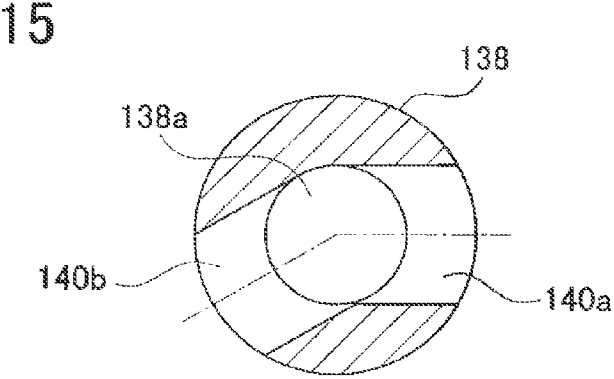
FIG. 15 explains another example of the suction part of the passage member.
Figure 16:
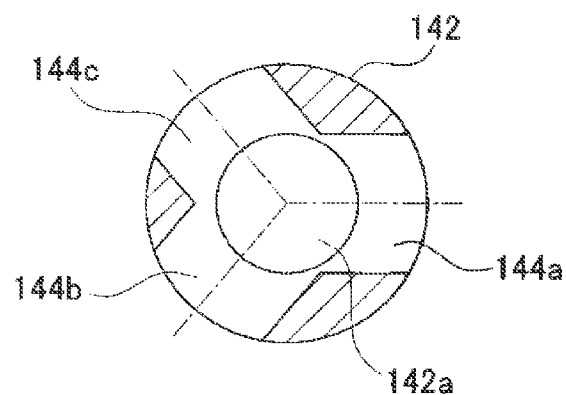
FIG. 16 explains another example of the suction part of the passage member.
Figure 17:
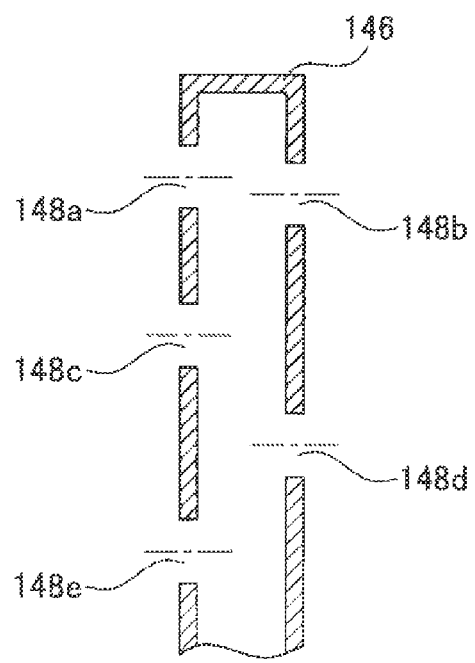
FIG. 17 explains another example of the suction part of the passage member.

In addition, as shown in FIG. 15, the suction part 138 of the passage member may have a first opening 140a with a first opening direction and a second opening 140b with a second opening direction that is different from the first opening direction. Also, as shown in FIG. 16, the suction part 142 may have three openings (144a, 144b, 144c), and each of the openings (144a, 144b, 144c) may have a different opening direction. Further, as shown in FIG. 17, the plurality of openings (148a, 148c, 148e) may be disposed at different intervals in a longitudinal direction of the suction part 146. Furthermore, the pair of openings 148a, 148b may partially face each other, and the opening 148d may be formed in a position distant from the openings 148c and 148e in the longitudinal direction of the suction part 146.

Finally, although the preferred embodiments have been described in detail, the present embodiments are merely for illustrative purpose only and are not restrictive. It is to be understood that various changes and modifications may be made without departing from the spirit or scope of the appended claims. In addition, the additional features and aspects disclosed herein may also be utilized singularly or in combination with the above aspects and features.

What is claimed is:

1. A suction filter configured to be connected to a suction port of a fuel pump, comprising:
a filter member configured to define an internal space; and
a plurality of passage members at least partially disposed in the internal space,
wherein each passage member has a fuel passage and at least one opening, the at least one opening of each passage member fluidly connecting the internal space of the filter member to the respective fuel passage and each fuel passage being configured to guide fuel from the internal space to a location external of the internal space of the filter member, and
in a cross-sectional plane through each passage member and through the at least one opening taken perpendicular to a longitudinal direction of each passage member, a first position on an outer circumferential surface of each passage member in the cross-sectional plane, which said first position is closest to the filter member and is impermeable, is offset in a circumferential direction of the passage member from a second position on the outer circumferential surface in the cross-sectional plane where the at least one opening is formed.

2. The suction filter according to claim 1, wherein:
the filter member comprises a first filtration surface and a second filtration surface,
the internal space is provided between the first filtration surface and the second filtration surface, and
the at least one opening has an opening direction oriented such that
(1) a first intersection point of a first line and a second line is located within the internal space, the first line extending from a first filtration surface side edge of the at least one opening in the opening direction, and the second line extending perpendicular to the first filtration surface so as to intersect a second filtration surface side edge of the at least one opening, and
(2) a second intersection point of a third line and a fourth line is also located within the internal space, the third line extending from the second filtration surface side edge of the at least one opening in the opening direction, and the fourth line extending perpendicular to the second filtration surface so as to intersect the first filtration surface side edge of the at least one opening.

3. The suction filter according to claim 2, wherein the opening direction of the at least one opening is parallel to the first and second filtration surfaces.

4. The suction filter according to claim 1, wherein each passage member has a plurality of openings, and the each of the plurality of openings fluidly connects the internal space of the filter member to the respective fuel passage.

5. The suction filter according to claim 4, wherein:
a first end of each passage member is disposed in the internal space of the filter member,
a second end of each passage member is configured to be connected to the suction port of the fuel pump, and
each of the plurality of openings has an opening area and the respective opening areas decrease in size in the direction from the first end to the second end.

6. The suction filter according to claim 5, wherein the plurality of openings are disposed at intervals along the longitudinal direction of each passage member.

7. The suction filter according to claim 6, wherein the suction filter is configured such that, when it is connected to the suction port of the fuel pump, an upper end of the filter member is positioned higher than the suction port.

8. The suction filter according to claim 7, wherein the filter member is shaped so as to surround a circumference of the fuel pump.

9. The suction filter according to claim 8, wherein
the filter member has a tubular-shape extending parallel to a longitudinal direction of the fuel pump,
each passage member extends through the internal space of the filter member and parallel to the longitudinal direction of the fuel pump, and
the openings each have an opening direction that extends in a circumferential direction of the fuel pump.

10. The suction filter according to claim 1, wherein the filter member is shaped so as to surround a circumference of the fuel pump and an upper end of the filter member is configured to be positioned higher than the suction port.

11. The suction filter according to claim 10, wherein the passage members are configured to extend parallel to a longitudinal direction of the fuel pump through the internal space of the filter member, the passage members being disposed at intervals in a circumferential direction of the fuel pump and the plurality of openings being disposed at intervals along the longitudinal direction of each respective passage member.

12. A fuel supply device, comprising:
a fuel pump; and
the suction filter according to claim 4 connected to a suction port of the fuel pump.

13. The fuel supply device according to claim 12, wherein:
the filter member comprises a first filtration surface and a second filtration surface,
the internal space is provided between the first filtration surface and the second filtration surface, and
each of the plurality of openings has an opening direction that extends parallel to the first and second filtration surfaces.

14. The fuel supply device according to claim 13, wherein:
a first end of each passage member is disposed in the internal space of the filter member,
a second end of each passage member is configured to be connected to the suction port of the fuel pump, and
each of the plurality of openings has an opening area and the respective opening areas decrease in size in the direction from the first end to the second end.

15. The fuel supply device according to claim 14, wherein the plurality of openings is disposed at intervals along the longitudinal direction of the passage member.

16. The fuel supply device according to claim 15, wherein the filter member surrounds a circumference of the fuel pump, and an upper end of the filter member is positioned higher than the suction port.

17. The fuel supply device according to claim 16, wherein the filter member has a tubular-shape extending in parallel to a longitudinal direction of the fuel pump, each passage member extends in parallel to the longitudinal direction of the fuel pump through the internal space of the filter member, and the openings each have an opening direction that extends in a circumferential direction of the fuel pump.

18. The fuel supply device according to claim 12, wherein the filter member surrounds a circumference of the fuel pump,
an upper end of the filter member is positioned higher than the suction port,
the passage members extend parallel to the longitudinal direction of the fuel pump through the internal space of the filter member and are disposed at intervals in a circumferential direction of the fuel pump, and the openings are disposed at intervals along the longitudinal direction of each passage member.

* * * * *